US009516022B2

(12) United States Patent
Borzycki et al.

(10) Patent No.: US 9,516,022 B2
(45) Date of Patent: Dec. 6, 2016

(54) AUTOMATED MEETING ROOM

(71) Applicant: Citrix Systems, Inc., Fort Lauderdale, FL (US)

(72) Inventors: Andrew Borzycki, Killara (AU); Mallikharjuna Reddy Deva, Sydney (AU); Nick Bissett, Bath (GB); Anil Roychoudhry, Woodcroft (AU); Martin Duursma, West Pennant Hills (AU)

(73) Assignee: GetGo, Inc., Fort Lauderdale, FL (US)

( * ) Notice: Subject to any disclaimer, the term of this patent is extended or adjusted under 35 U.S.C. 154(b) by 0 days.

(21) Appl. No.: 14/043,331

(22) Filed: Oct. 1, 2013

(65) Prior Publication Data

US 2014/0109210 A1 Apr. 17, 2014

Related U.S. Application Data

(60) Provisional application No. 61/713,554, filed on Oct. 14, 2012.

(51) Int. Cl.
*G06F 7/04* (2006.01)
*G06F 15/16* (2006.01)
(Continued)

(52) U.S. Cl.
CPC ........... *H04L 63/0861* (2013.01); *A63F 13/06* (2013.01); *G06F 3/017* (2013.01); *G06F 21/32* (2013.01);
(Continued)

(58) Field of Classification Search
CPC .......... G06F 21/30; G06F 21/32; G06F 3/017; G06F 21/6218; H04L 63/0861; G06Q 10/06; G06Q 10/109; A63F 13/06; A63F 13/213; H04M 3/56
See application file for complete search history.

(56) References Cited

U.S. PATENT DOCUMENTS 5,805,803 A 9/1998 Birrell et al.
6,151,606 A 11/2000 Mendez
(Continued)

FOREIGN PATENT DOCUMENTS

EP 1465039 A1 10/2004
EP 2403211 A1 1/2012
(Continued)

OTHER PUBLICATIONS

International Search Report and Written Opinion issued in PCT/US2013/063363, dated Dec. 20, 2013.
(Continued)

*Primary Examiner* — Jayesh Jhaveri
(74) *Attorney, Agent, or Firm* — BainwoodHuang

(57) ABSTRACT

Methods and systems for automatic setup and initiation of meeting resources are described herein. A meeting room, area, or resource may be equipped with a camera or other proximity based sensor to determine when a user enters the meeting area. The camera may perform initial recognition of a user, e.g., based on facial or body recognition. The system may then authenticate the user as the meeting organizer using a second recognition technique, e.g., voice recognition. Based on the user authentication, the system may query the meeting organizer's calendar (or other resource) for meeting information, download an associated meeting presentation from cloud storage, initiate meeting (e.g., screen sharing) software, notify any missing attendees that the meeting has begun, and launch the presentation on a shared screen. The meeting organizer may then control the presentation using video and/or voice. All may be completed
(Continued)

without the meeting organizer being required to touch anything.

24 Claims, 5 Drawing Sheets

(51) Int. Cl.
| | |
|---|---|
| G06F 17/30 | (2006.01) |
| H04L 29/06 | (2006.01) |
| A63F 13/20 | (2014.01) |
| G06F 3/01 | (2006.01) |
| G06F 21/32 | (2013.01) |
| G06F 21/35 | (2013.01) |
| G06Q 10/06 | (2012.01) |
| A63F 13/213 | (2014.01) |
| G06Q 10/10 | (2012.01) |
| G06F 21/62 | (2013.01) |
| G06F 21/30 | (2013.01) |
| H04M 3/56 | (2006.01) |

(52) U.S. Cl.
CPC .......... *G06F 21/35* (2013.01); *A63F 13/213* (2014.09); *G06F 21/30* (2013.01); *G06F 21/6218* (2013.01); *G06Q 10/06* (2013.01); *G06Q 10/109* (2013.01); *H04M 3/56* (2013.01)

(56) References Cited

U.S. PATENT DOCUMENTS

| | | | |
|---|---|---|---|
| 6,154,172 A | 11/2000 | Piccionelli et al. | |
| 6,480,096 B1 | 11/2002 | Gutman et al. | |
| 6,609,198 B1 | 8/2003 | Wood et al. | |
| 6,621,766 B2 | 9/2003 | Brewer et al. | |
| 6,751,738 B2 | 6/2004 | Wesinger, Jr. et al. | |
| 6,801,610 B1 * | 10/2004 | Malik ................ | H04M 3/56 379/202.01 |
| 6,859,879 B2 | 2/2005 | Henn et al. | |
| 6,883,098 B1 | 4/2005 | Roman et al. | |
| 7,043,453 B2 | 5/2006 | Stefik et al. | |
| 7,065,652 B1 | 6/2006 | Xu et al. | |
| 7,159,120 B2 | 1/2007 | Muratov et al. | |
| 7,240,015 B1 | 7/2007 | Karmouch et al. | |
| 7,254,831 B2 | 8/2007 | Saunders et al. | |
| 7,269,605 B1 | 9/2007 | Nguyen et al. | |
| 7,340,772 B2 | 3/2008 | Panasyuk et al. | |
| 7,415,498 B2 | 8/2008 | Russo et al. | |
| 7,437,752 B2 | 10/2008 | Heard et al. | |
| 7,490,073 B1 | 2/2009 | Qureshi et al. | |
| 7,490,352 B2 | 2/2009 | Kramer et al. | |
| 7,496,954 B1 | 2/2009 | Himawan et al. | |
| 7,502,861 B1 | 3/2009 | Protassov et al. | |
| 7,509,672 B1 | 3/2009 | Horwitz et al. | |
| 7,526,800 B2 | 4/2009 | Wright et al. | |
| 7,529,923 B2 | 5/2009 | Chartrand et al. | |
| 7,596,593 B2 | 9/2009 | Mitchell et al. | |
| 7,599,991 B2 | 10/2009 | Vargas et al. | |
| 7,665,125 B2 | 2/2010 | Heard et al. | |
| 7,697,737 B2 | 4/2010 | Aull et al. | |
| 7,716,240 B2 | 5/2010 | Lim | |
| 7,761,523 B2 | 7/2010 | May et al. | |
| 7,774,323 B2 | 8/2010 | Helfman | |
| 7,779,408 B1 | 8/2010 | Papineau | |
| 7,779,458 B1 | 8/2010 | Heiderscheit et al. | |
| 7,788,535 B2 | 8/2010 | Bussa et al. | |
| 7,788,536 B1 | 8/2010 | Qureshi et al. | |
| 7,865,888 B1 | 1/2011 | Qureshi et al. | |
| 7,904,468 B2 | 3/2011 | Neil et al. | |
| 7,950,066 B1 | 5/2011 | Zuili | |
| 7,966,323 B2 | 6/2011 | Bocking et al. | |
| 7,966,652 B2 | 6/2011 | Ganesan | |
| 7,970,386 B2 | 6/2011 | Bhat et al. | |
| 7,970,923 B2 | 6/2011 | Pedersen et al. | |
| 8,001,278 B2 | 8/2011 | Huggahalli et al. | |
| 8,012,219 B2 | 9/2011 | Mendez et al. | |
| 8,037,421 B2 | 10/2011 | Scott et al. | |
| 8,051,180 B2 | 11/2011 | Mazzaferri et al. | |
| 8,060,074 B2 | 11/2011 | Danford et al. | |
| 8,060,596 B1 | 11/2011 | Wootton et al. | |
| 8,078,713 B1 | 12/2011 | Kim | |
| 8,085,891 B2 | 12/2011 | Owen | |
| 8,095,517 B2 | 1/2012 | Sandoval et al. | |
| 8,095,786 B1 | 1/2012 | Kshirsagar et al. | |
| 8,126,128 B1 | 2/2012 | Hicks, III et al. | |
| 8,126,506 B2 | 2/2012 | Roundtree | |
| 8,181,010 B1 | 5/2012 | Uchil et al. | |
| 8,200,626 B1 | 6/2012 | Katzer et al. | |
| 8,214,887 B2 | 7/2012 | Clark et al. | |
| 8,238,256 B2 | 8/2012 | Nugent | |
| 8,239,918 B1 | 8/2012 | Cohen | |
| 8,245,285 B1 | 8/2012 | Ravishankar et al. | |
| 8,272,030 B1 | 9/2012 | Annan et al. | |
| 8,285,681 B2 | 10/2012 | Prahlad et al. | |
| 8,296,239 B2 | 10/2012 | Nonaka | |
| 8,296,821 B2 | 10/2012 | Nakae | |
| 8,332,464 B2 | 12/2012 | Dispensa et al. | |
| 8,359,016 B2 | 1/2013 | Lindeman et al. | |
| 8,365,258 B2 | 1/2013 | Dispensa | |
| 8,365,266 B2 | 1/2013 | Bogner | |
| 8,402,011 B1 | 3/2013 | Bodenhamer | |
| 8,406,748 B2 | 3/2013 | Raleigh et al. | |
| 8,418,238 B2 | 4/2013 | Platt et al. | |
| 8,463,253 B2 | 6/2013 | Chipalkatti et al. | |
| 8,463,946 B2 | 6/2013 | Ferguson et al. | |
| 8,468,090 B2 | 6/2013 | Lesandro et al. | |
| 8,468,455 B2 | 6/2013 | Jorgensen et al. | |
| 8,495,746 B2 | 7/2013 | Fissel et al. | |
| 8,528,059 B1 | 9/2013 | Labana et al. | |
| 8,549,656 B2 | 10/2013 | Blaisdell et al. | |
| 8,560,709 B1 | 10/2013 | Shokhor et al. | |
| 8,578,443 B2 | 11/2013 | Narain et al. | |
| 8,584,114 B2 | 11/2013 | Rabinovich et al. | |
| 8,601,562 B2 | 12/2013 | Milas | |
| 8,613,070 B1 | 12/2013 | Borzycki et al. | |
| 8,650,303 B1 | 2/2014 | Lang et al. | |
| 8,650,620 B2 | 2/2014 | Chawla et al. | |
| 8,660,530 B2 | 2/2014 | Sharp et al. | |
| 8,719,898 B1 | 5/2014 | Barton et al. | |
| 8,799,994 B2 | 8/2014 | Barton et al. | |
| 8,806,570 B2 | 8/2014 | Barton et al. | |
| 8,843,734 B2 | 9/2014 | Lim | |
| 8,850,010 B1 | 9/2014 | Qureshi | |
| 8,850,049 B1 | 9/2014 | Qureshi | |
| 8,856,909 B1 | 10/2014 | Chickering | |
| 8,863,297 B2 | 10/2014 | Sharma et al. | |
| 8,863,298 B2 | 10/2014 | Akella et al. | |
| 8,863,299 B2 | 10/2014 | Sharma et al. | |
| 8,881,228 B2 | 11/2014 | Qureshi | |
| 8,881,229 B2 | 11/2014 | Barton et al. | |
| 8,918,834 B1 | 12/2014 | Samuelsson | |
| 8,931,038 B2 | 1/2015 | Pulier et al. | |
| 9,213,850 B2 | 12/2015 | Barton et al. | |
| 2001/0042045 A1 | 11/2001 | Howard et al. | |
| 2002/0112047 A1 | 8/2002 | Kushwaha et al. | |
| 2003/0031319 A1 | 2/2003 | Abe et al. | |
| 2003/0037103 A1 | 2/2003 | Salmi et al. | |
| 2003/0046366 A1 | 3/2003 | Pardikar et al. | |
| 2003/0065947 A1 | 4/2003 | Song et al. | |
| 2003/0131245 A1 | 7/2003 | Linderman | |
| 2003/0157947 A1 | 8/2003 | Fiatal et al. | |
| 2003/0188193 A1 | 10/2003 | Venkataramappa | |
| 2003/0229623 A1 | 12/2003 | Chang et al. | |
| 2004/0006706 A1 | 1/2004 | Erlingsson | |
| 2004/0010579 A1 | 1/2004 | Freese | |
| 2004/0083273 A1 | 4/2004 | Madison et al. | |
| 2004/0111640 A1 | 6/2004 | Baum | |
| 2004/0117651 A1 | 6/2004 | Little et al. | |
| 2004/0123153 A1 | 6/2004 | Wright et al. | |
| 2004/0205233 A1 | 10/2004 | Dunk | |
| 2004/0230807 A1 | 11/2004 | Baird et al. | |
| 2005/0027843 A1 | 2/2005 | Bozak et al. | |
| 2005/0055578 A1 | 3/2005 | Wright et al. | |

(56) References Cited

U.S. PATENT DOCUMENTS

| | | |
|---|---|---|
| 2005/0076082 A1 | 4/2005 | Le Pennec et al. |
| 2005/0076085 A1 | 4/2005 | Budd et al. |
| 2005/0097608 A1 | 5/2005 | Penke et al. |
| 2005/0149340 A1 | 7/2005 | Murakami et al. |
| 2005/0172241 A1 | 8/2005 | Daniels et al. |
| 2005/0193222 A1 | 9/2005 | Greene |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0070114 A1 | 3/2006 | Wood et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0185004 A1 | 8/2006 | Song et al. |
| 2006/0224742 A1 | 10/2006 | Shahbazi |
| 2006/0225142 A1 | 10/2006 | Moon |
| 2006/0242685 A1 | 10/2006 | Heard et al. |
| 2006/0248577 A1 | 11/2006 | Beghian et al. |
| 2006/0259755 A1* | 11/2006 | Kenoyer ............................ 713/1 |
| 2006/0282889 A1 | 12/2006 | Brown et al. |
| 2007/0005713 A1 | 1/2007 | LeVasseur et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0109983 A1 | 5/2007 | Shankar et al. |
| 2007/0118558 A1 | 5/2007 | Kahandaliyanage |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0266422 A1 | 11/2007 | Germano et al. |
| 2007/0283324 A1 | 12/2007 | Geisinger |
| 2007/0285504 A1* | 12/2007 | Hesse ...................... H04N 7/15 348/14.08 |
| 2008/0027982 A1 | 1/2008 | Subramanian et al. |
| 2008/0040187 A1* | 2/2008 | Carraher ............ G06Q 10/109 705/7.19 |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0092215 A1 | 4/2008 | Soukup et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0304665 A1 | 12/2008 | Ma et al. |
| 2008/0313648 A1 | 12/2008 | Wang et al. |
| 2008/0317292 A1* | 12/2008 | Baker ............................ 382/115 |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0064292 A1 | 3/2009 | Carter et al. |
| 2009/0075630 A1 | 3/2009 | McLean |
| 2009/0077638 A1 | 3/2009 | Norman et al. |
| 2009/0083374 A1* | 3/2009 | Saint Clair .................... 709/203 |
| 2009/0089379 A1* | 4/2009 | Pegg ........................ G06F 9/54 709/206 |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199178 A1 | 8/2009 | Keller et al. |
| 2009/0199277 A1 | 8/2009 | Norman et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0265554 A1 | 10/2009 | Robles et al. |
| 2009/0282127 A1 | 11/2009 | Leblanc et al. |
| 2009/0282473 A1 | 11/2009 | Karlson et al. |
| 2009/0323916 A1* | 12/2009 | O'Sullivan et al. ..... 379/202.01 |
| 2009/0325615 A1 | 12/2009 | McKay et al. |
| 2010/0064341 A1 | 3/2010 | Aldera |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0228825 A1* | 9/2010 | Hegde ............................ 709/204 |
| 2010/0229197 A1 | 9/2010 | Yi et al. |
| 2010/0248699 A1 | 9/2010 | Dumais |
| 2010/0257580 A1 | 10/2010 | Zhao et al. |
| 2010/0279652 A1 | 11/2010 | Sharp et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0145833 A1 | 6/2011 | De Los Reyes et al. |
| 2011/0154266 A1* | 6/2011 | Friend ............................ 715/863 |
| 2011/0154477 A1 | 6/2011 | Parla et al. |
| 2011/0154498 A1 | 6/2011 | Fissel et al. |

(56) References Cited

U.S. PATENT DOCUMENTS

| | | |
|---|---|---|
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023506 A1 | 1/2012 | Maeckel et al. |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0198570 A1 | 8/2012 | Joa et al. |
| 2012/0204220 A1 | 8/2012 | Lavi |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238257 A1 | 9/2012 | Anson |
| 2012/0240183 A1 | 9/2012 | Sinha |
| 2012/0254768 A1 | 10/2012 | Aggarwal et al. |
| 2012/0255026 A1 | 10/2012 | Baca et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0035063 A1 | 2/2013 | Fisk et al. |
| 2013/0042294 A1 | 2/2013 | Colvin et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1* | 3/2013 | Bentley ............... H04L 12/1822 709/206 |
| 2013/0067229 A1 | 3/2013 | German et al. |
| 2013/0074142 A1 | 3/2013 | Brennan et al. |
| 2013/0084847 A1 | 4/2013 | Tibbitts et al. |
| 2013/0086684 A1 | 4/2013 | Mohler |
| 2013/0091543 A1 | 4/2013 | Wade et al. |
| 2013/0097421 A1 | 4/2013 | Lim |
| 2013/0097660 A1 | 4/2013 | Das et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0132457 A1 | 5/2013 | Diwakar |
| 2013/0132941 A1 | 5/2013 | Lindeman et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0145448 A1 | 6/2013 | Newell |
| 2013/0151598 A1 | 6/2013 | Fu et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |

(56) References Cited

U.S. PATENT DOCUMENTS

| | | |
|---|---|---|
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0305337 A1* | 11/2013 | Newman ............ H04L 12/1818 726/7 |
| 2013/0311593 A1 | 11/2013 | Prince et al. |
| 2013/0311597 A1 | 11/2013 | Arrouye et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047535 A1 | 2/2014 | Parla et al. |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0108649 A1 | 4/2014 | Barton et al. |
| 2014/0130174 A1 | 5/2014 | Celi, Jr. et al. |
| 2014/0162614 A1 | 6/2014 | Lindeman et al. |
| 2014/0173700 A1 | 6/2014 | Awan et al. |
| 2014/0181934 A1 | 6/2014 | Mayblum et al. |
| 2014/0189808 A1 | 7/2014 | Mahaffey et al. |
| 2014/0298401 A1 | 10/2014 | Batson et al. |
| 2014/0315536 A1 | 10/2014 | Chow et al. |
| 2015/0026827 A1 | 1/2015 | Kao et al. |
| 2015/0087270 A1 | 3/2015 | Richardson et al. |

FOREIGN PATENT DOCUMENTS

| | | |
|---|---|---|
| EP | 2428894 A1 | 3/2012 |
| EP | 2523107 A1 | 11/2012 |
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2009021200 A1 | 2/2009 |
| WO | 2010054258 A1 | 5/2010 |
| WO | 2010115289 A1 | 10/2010 |

OTHER PUBLICATIONS

"Citrix XenMobile Technology Overview: White Paper," Citrix White Papers online, Jul. 31, 2012, pp. 1-14; retrieved from http://insight.com/content/aam/insight/en_US/pdfs/citrix/xenmobile-tech-overview.pdf, retrieved Jan. 27, 2014.

Andreas, Digging into the Exchange ActiveSync Protocol, Mobility Dojo.net, Oct. 25, 2010, http://mobilitydojo.net/2010/03/17/digging-into-the-exchange-activesync-protocol/.

Apple Inc., iPad User Guide for iOS 6.1 Software, Jan. 2013, Chapter 26, Accessibility, pp. 107-108.

Lowe, "Application-Specific VPNs," Dec. 13, 2005.

Mysore et al., "The Liquid Media System—a Multi-Device Streaming Media Orchestration Framework", Ubicomp 2003 Workshop, pp. 1-4.

Na et al., "Personal Cloud Computing Security Framework," 2010 IEEE Asia-Pacific Computing Conference, 2010, pp. 671-675.

Ranjan et al., "Programming Cloud Resource Orchestration Framework: Operations and Research Challenges", arvix.org, 2012, pp. 1-19.

Wilson et al., "Unified Security Framework", In proceedings of the 1st International Symposium on Information and Communication Technologies, pp. 500-505. Trinity College Dublin, 2003.

Wright et al., "Your Firm's Mobile Devices: How Secure are They?". Journal of Corporate Accounting and Finance. Jul. 1, 2011. Willey Periodicals. pp. 13-21.

Xuetao Wei, et al., "Malicious Android Applications in the Enterprise: What Do They Do and How Do We Fix It?,"• ICDE Workshop on Secure Data Management on Smartphones and Mobiles, Apr. 2012, 4 pages.

Laverty, Joseph Packy, et al., Comparative Analysis of Mobile Application Development and Security Models, [Online] 2011, Issues in Information Systems vol. XII, No. 1, [Retrieved from the Internet] <http://iacis.org/iis/2011/301-312_AL2011_1694.pclf> pp. 301-312.

Potharaju, Rahul, et al., Plagiarizing smartphone applications: attack strategies and defense techniques, [Online] 2012, Engineering Secure Software and Systems, Springer Berlin Heidelberg, [Retrieved from the Internet] <http://link.springer.com/chapter/10.1007/978-3-642-28166-2_11#> pp. 106-120.

Peine, H., Security concepts and implementation in the Ara mobile agent system, [Online] 1998, Enabling Technologies: Infrastructure for Collaborative Enterprises, 1998 Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.

Shah et al., Securing Java-Based Mobile Agents through Byte Code Obfuscation Techniques, [Online] Dec. 23-24, 2006, Multitopic Conference, 2006, INMIC '06. IEEE, [Retrieved from the Internet] <http://ieeexplore.ieee.org/stamp/stamp.jsp?tp=&arnumber=4196425&isnumber=414013> pp. 305-308.

Administration Guide for Symantec Endpoint Protection and Symantec Network Access Control; 2008; Retrieved from the Internet <URL:ftp.symantec.com/public/english_us_canada/products/symantec_endpoint_protection/11.0/manals/administration_guide.pdf>; pp. 1-615.

Symantec Network Access Control Enforcer Implementation Guide; 2007; Retrieved from the Internet <URL:ftp.symantec.com/public/english_us_canada/products/symantec_network_access_control/11.0/manuals/enforcer_implementation_guide.pdf>; pp. 1-132.

* cited by examiner

AUTOMATED MEETING ROOM

CROSS-REFERENCE TO RELATED APPLICATION

This application claims the benefit of U.S. Provisional Patent Application No. 61/713,554 entitled "Automated Meeting Room" and filed on Oct. 14, 2012, which is incorporated by reference in its entirety herein.

FIELD

This application generally relates to an apparatus and method of automating meeting presentation such as photos, digitally stored images, or presentation slides. In particular, this application relates to automatically authenticating and accessing meeting collaboration resources without the meeting presenter or organizer having to have a direct physical interaction with any of the associated meeting collaboration resources.

BACKGROUND

Meeting presenters in the past have faced a variety of obstacles in being able to seamlessly present multimedia presentations. These obstacles required significant time and/or expertise to overcome and required that the presenter arrive a significant time prior to the start of the meeting in order to assure a seamless presentation. Some of these challenges included (1) having to log into the computer in the meeting area; (2) configuring the projector or other display devices to work with the computer; (3) preparing the computer with the presentation which could include installing the appropriate presentation software; (4) initializing and running any internet presentation software such as GoToMeeting, WebEx, and the like; and (5) making sure any remote attendees are connected. While the time needed to overcome some of these obstacles could be shortened by the presenter using a dedicated computer previously configured with all the appropriate software, this significantly lengthened the time to overcome other obstacles such as configuring the projector or other display devices to work with a computer to which they had never previously been connected. All of these obstacles required the presenter to expend significant time and resources prior to the meeting in order to have a seamless presentation and not waste the time of the attendees in waiting for these obstacles to be overcome once the meeting was scheduled to start.

SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

To overcome the above described problems in the prior methods of meeting presentation described above, and to overcome other limitations that will be apparent upon reading and understanding the present specification, aspects described herein are directed to an automated manner of configuring the meeting room computer and all associated equipment and software needed for a presentation, e.g., upon entry of the meeting presenter into the meeting area without the meeting presenter ever physically touching a computer or associated equipment in the meeting room.

A first aspect provides for the automated detection and biometric identification of the meeting presenter upon entry into the meeting area. This aspect further authenticates the presenter's identity, automatically configures the hardware and software necessary for the presentation, and contacts attendees not currently present at the meeting without the presenter having to turn on, login or initialize any software on any computer or turn on and configure any associated hardware with any computer.

A second aspect provides for the automated detection of visual or audible cues from the presenter to advance through the material prepared for presentation at the meeting without the presenter having to directly interact with computer or associated input/output device and thus freeing the presenter from the tether of the range of the input/output device and allowing the presenter to freely roam throughout the meeting area during the presentation.

BRIEF DESCRIPTION OF THE DRAWINGS

A more complete understanding of illustrative embodiments and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. As used in this description computer-readable media refers to all computer-readable media with the sole exception being a transitory propagating signal.

Figure 1:
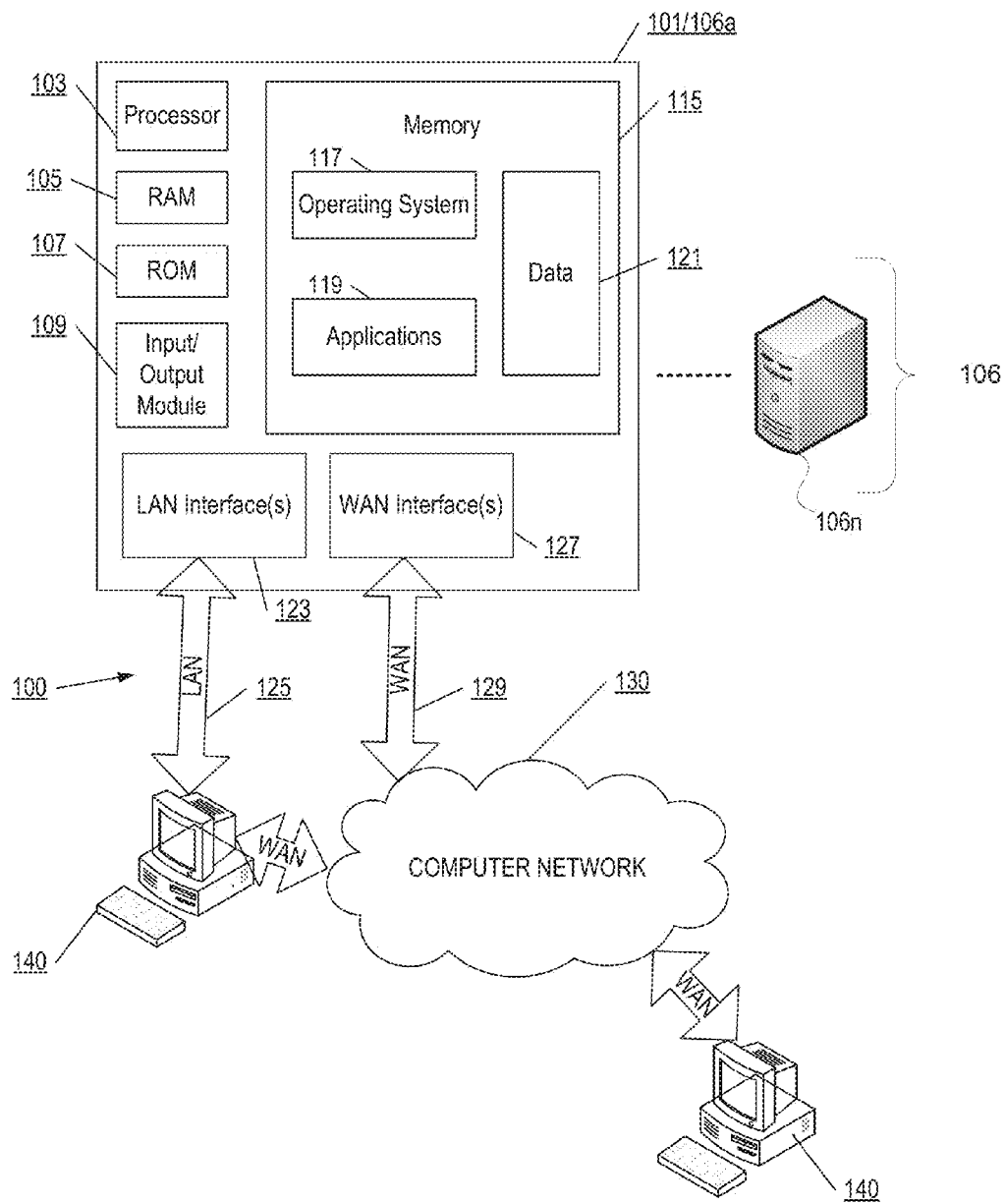
FIG. 1 illustrates an example operating environment in which various aspects of the disclosure may be implemented.

FIG. 1 illustrates an example block diagram of a generic computing device 101 in an example computing environment 100 that may be used according to one or more illustrative embodiments of the disclosure. The generic computing device 101 may have a processor 103 for controlling overall operation of the computing device and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more other computing devices, such as computing devices 140. The computing devices 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

One or more computing devices 101 and/or 140 can transmit data over a network 130 installed between machines and appliances within the computing environment 100. The network 130 can comprise one or more sub-networks, and can be installed between any combination of the computing devices 101 and/or 140, computing machines and appliances included within the computing environment 100. In some embodiments, the network 130 can be: a local-area network (LAN); a metropolitan area network (MAN); a wide area network (WAN); a primary network 104 comprised of multiple sub-networks located between the computing devices 101 and 140; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

According to one or more aspects, generic computing device 101 may be a server 106a in a single-server or multi-server desktop virtualization system configured to provide virtual machines for client access devices. One or more of the computing devices 140 may be client devices and may be in communication with one or more servers 106a-106n (generally referred to herein as "server(s) 106"). In some embodiments, the computing environment 100 may include an appliance installed between the server(s) 106 and client machine(s) 140. The appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In some embodiments a single client machine 140 communicates with more than one server 106, while in other embodiments a single server 106 communicates with more than one client machine 140. In yet other embodiments, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In some embodiments, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA®) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or MOUNTAIN LION) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME® or CITRIX PRESENTATION SERVER; MICROSOFT WINDOWS Terminal Services manufactured by the Microsoft Corporation; or an ICA® client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING® provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

As previously described, FIG. 1 may illustrate a high-level architecture of an illustrative system. As shown, the system may be single-server or multi-server system, including at least one server 106 configured to provide applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
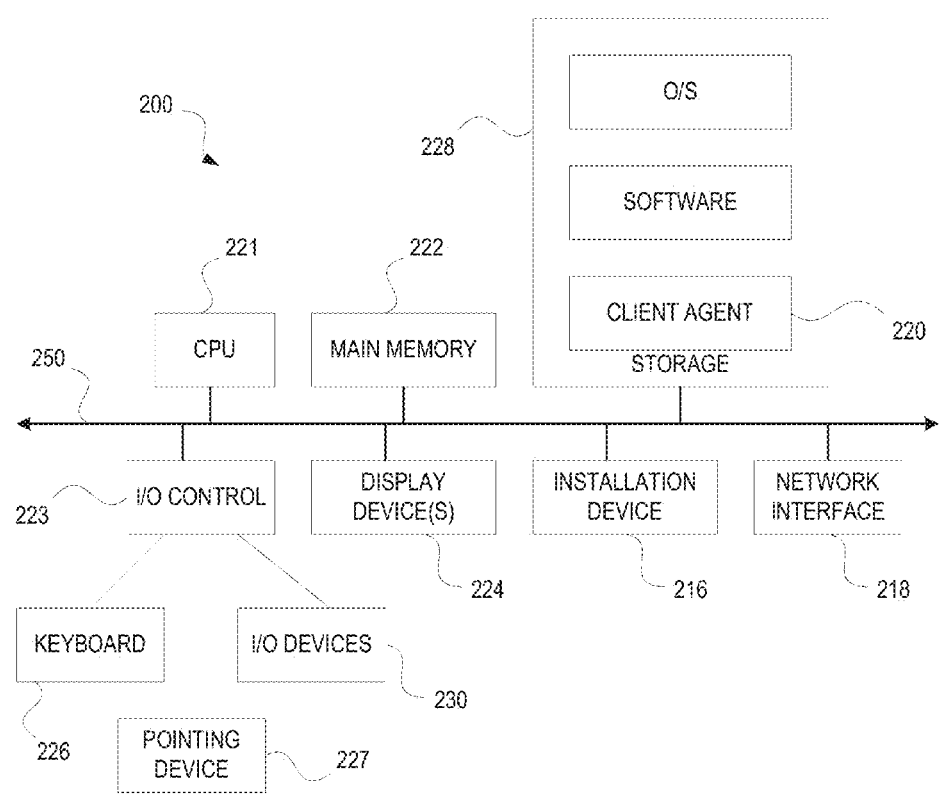
FIG. 2 illustrates a device that may be used in accordance with one or more illustrative aspects described herein.

Illustrated in FIG. 2 is an embodiment of a computing device 200, where the computing devices 101 and 140 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

Figure 3:
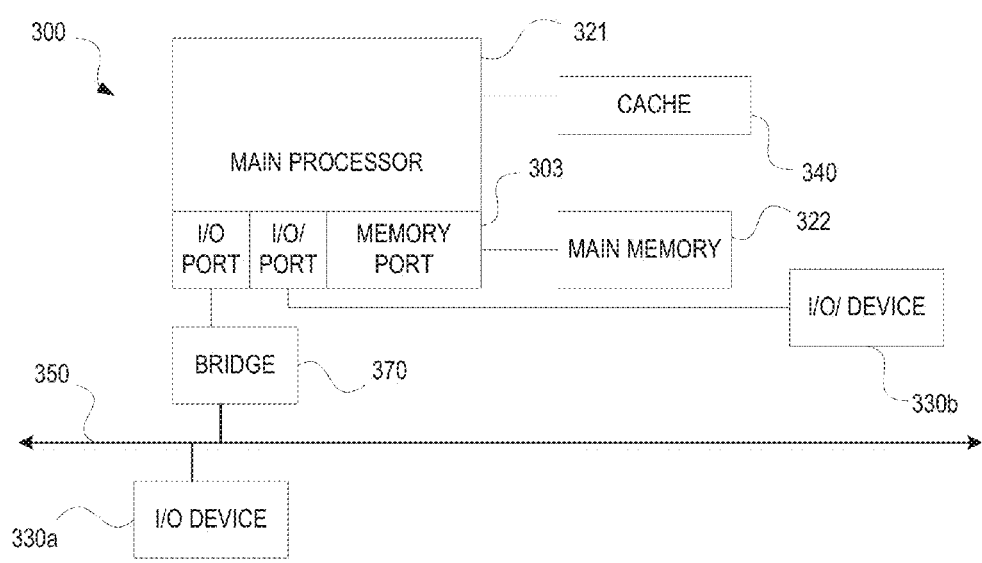
FIG. 3 illustrates a device that may be used in accordance with one or more illustrative aspects described herein.

FIG. 3 illustrates one embodiment of a computing device 300, where the computing devices 101 and 140 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; those manufactured by International Business Machines; a processor such as those manufactured by Advanced Micro Devices; or any other combination of logic circuits. Still other embodiments of the central processing unit 321 may include any combination of the following: a microprocessor, a microcontroller, a central processing unit with a single processing core, a central processing unit with two processing cores, or a central processing unit with more than two processing cores.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In some embodiments, the processing unit 321 may comprise one or more parallel processing cores. The processing cores of the processing unit 321 may, in some embodiments, access available memory as a global address space, or in other embodiments, memory within the computing device 300 can be segmented and assigned to a particular core within the processing unit 321. In some embodiments, the one or more processing cores or processors in the computing device 300 can each access local memory. In still other embodiments, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, a BLU-RAY drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network. Display devices 224 include, but are not limited to, projectors, monitors, and the like.

In some embodiments, the computing machine 200 can execute any operating system, while in other embodiments the computing machine 200 can execute any of the following operating systems: versions of the MICROSOFT WINDOWS operating systems such as WINDOWS 3.x; WIN- DOWS 95; WINDOWS 98; WINDOWS 2000; WINDOWS NT 3.51; WINDOWS NT 4.0; WINDOWS CE; WINDOWS XP; WINDOWS VISTA; WINDOWS 7; and WINDOWS 8; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc.; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

While FIGS. 1-3 generally describe a remote virtualization environment, a locally virtualized machine may be used as well, e.g., using a type 1 or type 2 hypervisor. Alternatively, a traditional non-virtualized installation may be used as well.

Figure 4:
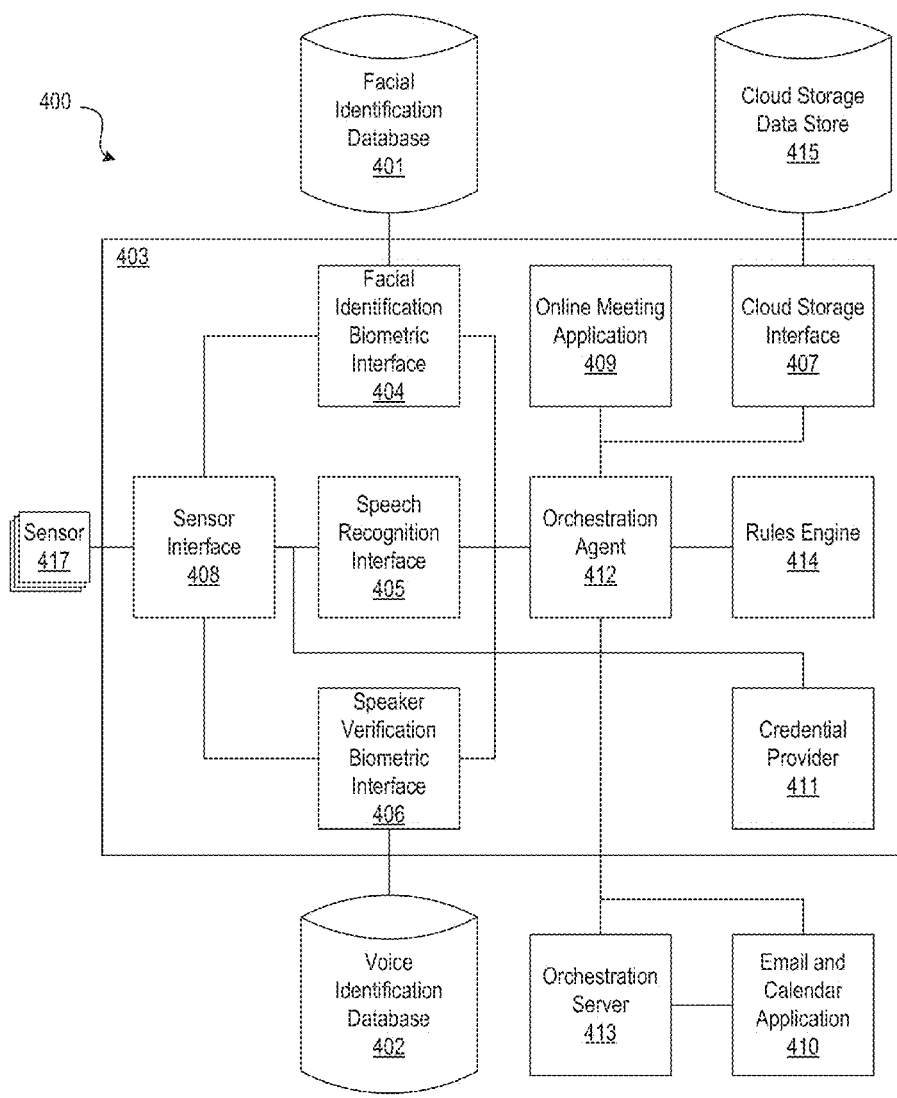
FIG. 4 illustrates a device that may be used in accordance with one or more illustrative aspects described herein.

Illustrated in FIG. 4 is an illustrative embodiment of a computing system 400 for use in various aspects. This computing system may include a facial identification database 401 and a voice identification database 402 which can be separate or portions of an overall larger database. The facial identification database 401 may store face prints for comparison, and the voice identification database 402 may store voice prints for comparison. Also within this system is a presentation storage memory 403 that stores the material for the presentation. This system 400 may further include program modules that interface with presentation storage memory 403, identification databases 401-402, and one or more sensors 417 connected to the computing devices (101 in FIG. 1). The sensors 417 may include, e.g., motion sensors, camera, microphones, presence detection sensors, and face tracking sensors.

The system 400 may further include software or hardware that controls an online meeting application 409 (e.g., GoToMeeting) and an email and calendar application 410 (e.g., Microsoft Exchange). The system 400 may also include software or hardware that facilitate various aspects. The system 400 may include, e.g., a credential provider 411 that provides user credentials for the system; an orchestration agent 412 that orchestrates interaction between the components or other servers such as orchestration server 413; and a rules engine 414 that provides the decision-making that is followed in the procedure implemented by one or more embodiments described herein.

The computing system may also include a facial identification biometric interface 404 in communication with the facial identification database 401; a speech recognition interface 405; a speaker verification biometric interface 406 in communication with the voice identification database 402; a cloud storage interface 407 in communication with a cloud storage data store 415; and a sensor interface 408 in communication with the one or more of the sensors 417. These components will be discussed in further detail below.

In general, any of the components of computing system 400 can be incorporated in any of the computing devices 101, 106, or 140 illustrated in FIG. 1 or even in computing devices/databases/servers not illustrated (e.g., somewhere in the cloud, in the computer network 130, or elsewhere). For example, any one or more of components 401-403, 410 413, 415, or 417 could be incorporated in computer device 106, computer network 130, or the cloud. For further example, any one or more of components 404-409, 411-412, or 414 could be incorporated in computer device 140. As a further example all of the components of FIG. 4 could be implemented in a computing device 140 located in the meeting area wherein further connection to any of the remainder of the computer network 130 is accomplished via the orchestration server 413 that could be physically located in any portion of computer network 130.

The systems and architectures described above with reference to FIGS. 1-4, as well as other systems and architectures, may be used to implement the functionality described below.

Any device, including computing devices 101 (e.g., servers 106 and 140), another computing device, a sensor, etc. may detect the presence of a user. For the sake of brevity, the disclosure will describe computing device 140 as detecting users' presence. For example, computing device 140 may detect the user with a presence sensor, such as a camera (e.g., an RGB camera, an IR camera, a 3D camera), an audio sensor (e.g., a microphone), or any other sensor configured to detect the presence of a user. The sensors may be wholly or partially integrated with the computing device (e.g., a laptop having an integrated webcam) or may be stand-alone devices (e.g., an external webcam). In some aspects, the presence sensor may be a Microsoft Kinect or other device having multiple sensors.

Figure 5:
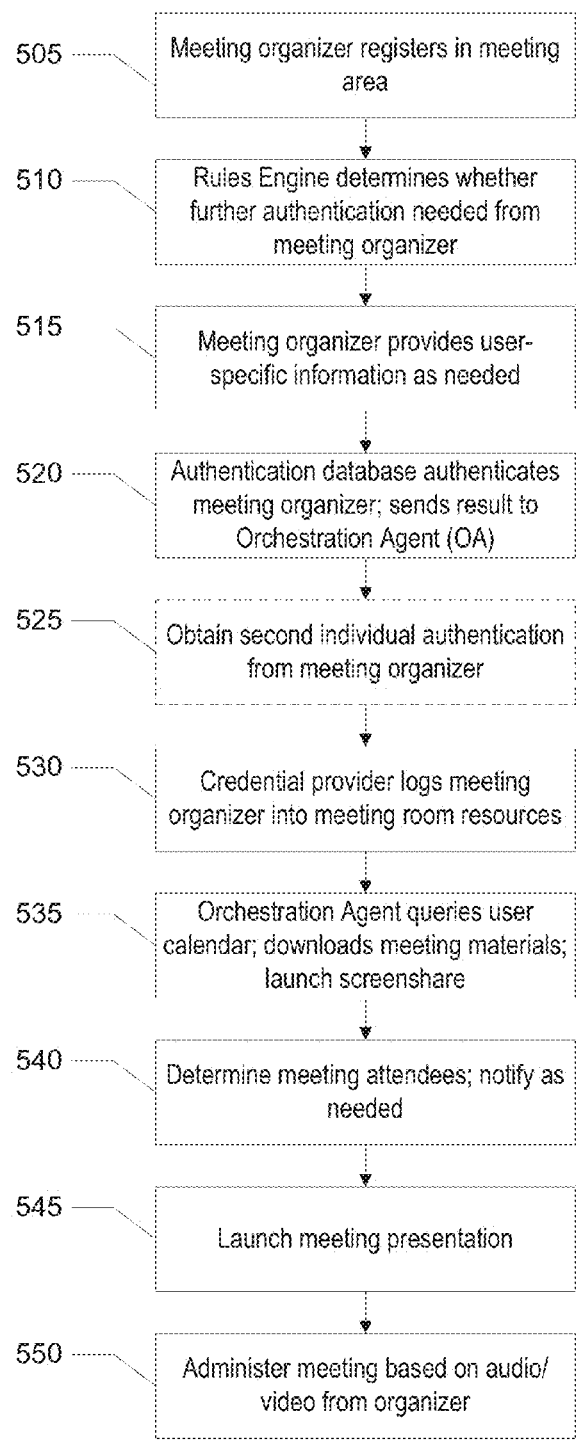
FIG. 5 illustrates flowchart of a method that may be followed in accordance with one or more illustrative aspects described herein.

FIG. 5 shows a flowchart of an illustrative method for displaying a meeting presentation automatically upon entry of the meeting organizer into the room or area where the presentation is to be displayed. The entry of the meeting organizer or presenter is registered (step 505) by a camera, microphone, biometric sensor, RFID reader, or other sensor 417 registering the entry of each user to the room or meeting area. The information that an individual entered the meeting area is sent from the sensor to a sensor interface 408. Upon receipt of information from the sensor 417, the sensor interface 408 transmits the information to an orchestration agent 412, which in turn transmits the information to the rules engine 414. Rules engine 414 then determines whether the person entering the room needs to be further authenticated as the meeting organizer or presenter (step 510) and transmits that determination to the orchestration agent 412. If so, orchestration agent 412 then instructs the meeting organizer to identify the specific information that is unique to each individual (step 515). After the sensor 417 captures any additional user-specific information, the sensor interface 408 transmits that information to the facial identification biometric interface 404 where, in step 520, the facial identification biometric interface queries the facial identification database 401 to determine the identity of the individual entering the meeting area. When the identity of the individual entering the meeting area is preliminary determined to be the meeting organizer by the query of the facial identification database, the facial identification database interface 404 transmits that preliminary match to the rules engine 414 via the orchestration agent 412. Upon receipt of the preliminary match information the rules engine 414 in step 525 may optionally request verification of identity of the individual through a second match of user specific information via a directed request to the individual through the orchestration 412 agent.

The speaker verification biometric interface 406 receives, via another sensor 417, the individual's response to the query and queries the voice identification database 402 to authenticate the identity of the individual. Upon successful authentication of the individual, this success is transmitted to the orchestration agent 412, which in turn transmits this information to the rules engine 414. After determining the identity of the user, the rules engine 414 directs the credential provider 411, via the orchestration agent 412, to log the individual in to the computer system (step 530). The orchestration server 413 then queries the electronic calendar of the individual (e.g., at the email and calendar application 410) and determines that the individual is hosting a meeting with an electronic presentation and directs the orchestration agent to set up a meeting with that specific electronic presentation and other meeting details (step 535). The orchestration agent 412, via the rules engine 414, requests a meeting presentation database (e.g., the cloud storage data store 415) to download the presentation for the meeting, configures the necessary physical connections and requests that any internet accessible online meeting application 409 (e.g., GoToMeeting, WebEx, LiveMeeting) start the meeting using the meeting details.

After the meeting is started, the orchestration agent 412 checks the meeting attendees and determines if any required attendees are not present (step 540). If required attendees are not present, the orchestration agent 412 notifies the required attendees. Once download of the presentation is completed, the rules engine 414 initiates the meeting and via the orchestration agent 412 and initiates display of the downloaded presentation commence (step 545).

The steps described above illustrate by way of example that the system may first utilize the facial identification database 401 to obtain preliminary match information and optionally request verification of the identity of the individual through a second match in response to a query of the voice identification database 402. It will be appreciated, however, that in some example embodiments, the system may first utilize the voice identification database 402 to obtain preliminary match information and optionally request verification of the identity of the individual through a second match in response to a query of the facial recognition database 401.

In some embodiments the presence of all individuals including the meeting organizer can be initially detected by a camera and using facial recognition techniques compared to the facial identification database 401. Other methods of initial detection and identification of individuals (through appropriate databases) may be used, e.g., biometric sensors, RFID cards, etc. When visual recognition systems are used for initial detection of the meeting organizer, aspects described herein can continue to use these systems to further automate the presentation. For example, the camera on a Microsoft Kinect or other similar systems such as smart TVs and other gaming platforms can follow the user throughout the presentation and based on interaction between the rules engine 414, the orchestration agent 412 and one or more of the sensors 401, may optionally automatically advance the presentation in step 550 by capturing and processing hand or other body movements of the presenter throughout the presentation In some embodiments the authentication of the meeting presenter can be accomplished via recording of the individual's voice through an input device such as a microphone and using well-known voice recognition techniques utilizing the voice identification database 402. Other methods of authentication of the meeting presenter (through appropriate databases) include all the techniques described above that could be used for initial identification, or others that may be known in the art. Similarly, when initial detection or authentication of the meeting organizer is done through speech recognition, aspects described herein may continue to use these systems to further automate the presentation in step 550. For example, predetermined words (e.g., "Next") from the presenter can be stored and when spoken by the presenter, processed via the rules engine and orchestrator engine to generate commands to automatically advance the presentation.

Some embodiments that query the electronic calendar of the user may be accomplished using the electronic calendar that a user may keep as part of their email system, such as OUTLOOK. Other methods and software used to keep electronic calendars that can be accessed include electronic calendars kept as part of other email software such as Lotus Notes, Gmail, or others.

In some aspects, the request that the meeting database download the presentation for the meeting would request the file from cloud storage data store 415, e.g., ShareFile. Any other similar type databases (e.g., DropBox, Box, SkyDrive) may be used. In some aspects, the orchestration agent 412 may configure VOIP connections or other similar connections and enable any online meeting applications (e.g., GoToMeeting, WebEx,) to start the online version of the meeting using the meeting details.

Some aspects that notify required attendees that are not currently attending the meeting include (1) checking social networking sites of the required attendees and automatically posting messages on those sites reminding the required attendee of the meeting; (2) automatically sending a reminder message to one or more of the required attendees email addresses; (3) or automatically texting the required attendee a reminder of the meeting. Other notification methods and technologies may be used.

Aspects described above reduce the significant amount of time it takes to authenticate and access collaboration resources, such as a meeting room PC, projector, online meeting applications, and any associated presentation for a meeting. For example, it can take up to 15 minutes when a user enters a meeting room before the user is actually ready to start a meeting. The user spends time on logging into the computer, configuring the projector to work with the computer, getting the presentation available, starting the online meeting application, dialing any remote attendees, and so on.

Thus, using aspects described herein, the user can easily switch to a new meeting so that the time spent on getting ready for a meeting is reduced from several minutes to a few seconds. In one illustrative embodiment, when a meeting organizer enters a meeting room, their physical presence is detected. The meeting organizer looks at a camera, and their face is recognized, which provides an initial biometric phase of authentication. Next, using another biometric mechanism, such as speaker verification, the user is fully authenticated (when second authentication is needed) into the meeting room and its resources. At this point the system knows the meeting organizer is present, queries the schedule of the organizer, determines where the presentation file for the meeting is located, and starts the meeting software. If any required attendee did not join the meeting, the system may automatically notify them about the meeting. If the attendee is not online in any social networks, the invention may send an email or text message about the meeting. The meeting organizer can interact with the presentation using speech recognition or hand gestures to progress through slides, all without the meeting organizer having to sit down at a computer at all.

The system software may execute on a meeting room computer or endpoint device. For example, Microsoft Windows-based implementations may be used. Implementations on other operating systems such as Mac OSX or Linux may also be used, but may depend on the availability of drivers for sensors such as the Microsoft Kinect or other sensors being used.

As shown in FIG. 4, some components of the system may include a camera sensor 417 such as Microsoft Kinect, which contains a camera, depth sensor and directional microphone array. With these components, the Microsoft Kinect is capable of face tracking and detection of human presence. A camera sensor may be the primary sensor through which the user of the system will interact for the duration of their meeting. Any combination of camera, depth detection and directional microphone system may be used. The Microsoft Kinect is just one example. Another component is the facial identification database storing face prints of those enrolled in the system. Another component is the voice identification database, which stores the voice prints of those enrolled in the system. ShareFile is an example of a cloud storage data store that may store presentations and other content to be displayed in a meeting.

The system 400 may include various components, such as the orchestration server 413. The orchestration server 413 keeps track of presence information for users of the system, and is responsible for managing devices and computers connected to the orchestration server.

The client-side components may be installed on each endpoint client device managed by the system 400, and may include the following components:

a. A sensor interface 408 controls the external sensors, which may include video and audio inputs such as a Microsoft Kinect. The sensor interface 408 may receive video frames and/or audio frames, and processes the frames so the facial identification biometric interface 404, speech recognition interface 405, and speaker verification biometric interface 406 can compare them to face prints and voice prints.

b. A facial identification biometric interface 404 controls the facial biometric software and is used to identify the face of someone entering the room.

c. A speaker verification biometric interface 406 controls the speaker verification biometric software and is used to verify the voice print of someone speaking to the system.

d. A speech recognition interface 405 controls speech recognition software used for interpreting what the user says, and provides a stream of recognized text to the rest of the system.

e. A cloud storage interface 407 is used to provide access to materials stored at a cloud storage data store, e.g., ShareFile. Materials may include presentation content, such as PowerPoint documents or other presentation materials. The cloud storage interface 407 ensures these materials are available on a client device by programmatically driving the cloud storage data store 415.

f. An online meeting application 409, e.g., GoToMeeting, is used as the collaboration mechanism to share meeting content among meeting attendees, as well as providing audio connectivity among attendees.

g. An orchestration agent 412 is the administrative component of the software on the endpoint client device. The orchestration agent 412 has knowledge of the other components of the system 400 and issues commands to the different components of the system. The orchestration agent 412 is responsible for actions such as receiving a notification that a person is fully authenticated and issuing one or more commands to the cloud storage interface 407 to retrieve the presentation content issuing one or more commands to the online meeting application 409 with meeting details obtained from the email and calendar server 410.

h. A rules engine 414 is the component that determines which action should be taken based upon events or input, such as in response to authenticating a user. The rules engine 414 indicates to the orchestration agent 412 which actions should be taken, and the orchestration agent 412 initiates those actions in response.

i. A credential provider 411 authenticates a user onto a client device after they have been biometrically authenticated. The credential provider 411 may be a Windows credential provider, and the client device may be a Windows workstation.

To illustrate how these components may work together, the following describes an illustrative use case scenario as someone walks into a room, is noticed by the system, gets authenticated, and automatically starts their meeting and content.

The system 400 may be running on the PC in a meeting room, and may be connected to a Microsoft Kinect sensor bar 417. When a person walks into the room, the Kinect 417 detects their presence, and indicates this by displaying skeletons that are identified and tracked. The sensor interface 408 receives this notification. The sensor interface 408 passes the notification to the orchestration agent 412. The orchestration agent 412 passes the notification to the rules engine 414. The rules engine 414 determines that at this point that the user needs to be authenticated, and indicates this result to the orchestrator agent 412. The orchestrator agent switches on facial detection. Video frames are passed from the Kinect to the sensor interface 408 and then to the facial identification biometric interface 404. The facial identification biometric interface 404 utilizes the facial identification database 401 to determine who has entered the room. When a facial identity has been determined, the facial identification biometric interface indicates this to the orchestrator agent 412, which passes the result to the rules engine 414. The rules engine determines to next verify the user's identity using speaker verification. The orchestration agent 412 indicates to the user an audible or visual response to provide in order to confirm their identity using their voice. The speech recognition interface 405 receives the audio stream from the Kinect via the sensor interface 408 and recognizes the phrase used for speaker verification. The recorded speech utterance is then passed to the speaker verification biometric interface 406, which utilizes the voice identification database 402 to verify the speaker's identity.

When the identity is successfully verified, the orchestration agent 412 receives a notification of successful verification, and passes this information to the rules engine 414. The rules engine 414 then determines that the user is someone who they claim to be, and indicates to the orchestrator agent to log them onto the client device using the credential provider 411. Once the orchestrator agent 412 has logged the user on, the orchestrator agent indicates to the orchestrator server 413 that the user is present on the client device in the meeting room. The orchestrator server 413 now knows the user is present on the client device, and will direct any actions or notifications to the client device in the meeting room. The orchestrator server 413 may analyze the calendar for the user, and determine that the individual is presently hosting a meeting with a PowerPoint presentation. The orchestration server 413 issues an instruction to the orchestration agent 412 to set up the meeting with the given content and meeting details. The orchestration agent 412 passes the request to the rules engine 414. The rules engine 414 provides the instructions regarding the meeting to the orchestrator agent 412. The orchestrator agent 412 issues a request to the cloud storage interface 407 to download the materials for the presentation from the cloud storage data store 415. The orchestrator agent 412 issues a request to the online meeting application 409 to start the meeting with the given details. The orchestration agent 412 may set up a VoIP connection. The orchestrator agent 412 checks the attendee list to determine if any required attendees are missing. If so, the orchestration agent 412 initiates a notification to the attendees that have not yet joined the meeting. Once the cloud storage interface 407 has obtained the materials for the presentation, the rules engine 414 determines to start the meeting and determines to enable the presentation. The orchestrator agent 412 issues a request to start PowerPoint in presentation mode and show the screen of the user's client device.

The above illustrative scenario is non-limiting, as steps may be added, removed, combined, split, and/or reordered. Other specific types of hardware and/or software may be used other than those recited above.

Various aspects described above allow organizations and user to detect the physical presence of a user in a meeting room as a trigger to begin the setup of a collaborative meeting. Other aspects combine multiple biometric and/or proximity mechanisms together that do not require physical touch, e.g., using biometrics that do not interrupt a user's work flow by requiring them to go to a particular point. Some aspects use a person's presence and calendar to actively initiate actions on the person's behalf. Some aspects use natural interaction mechanisms such as speech recognition and hand gestures to drive a meeting presentation. Some aspects combine all of these features together to create a frictionless user experience, which can dramatically improve the time to productivity in a meeting.

While certain illustrative embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc.), or semiconductor storage medium (volatile and non-volatile). In addition, although method steps have been depicted in flowcharts in a particular order, the steps may be performed an order different than that shown, and one or more steps may be optional or omitted in accordance with various aspects of the disclosure.

What is claimed is:

1. A method comprising:
   detecting a physical presence of a user in a predetermined meeting area, said detection using a proximity-based sensor;
   determining an identity of the user based on the proximity-based sensor by facial recognition;
   determining that the identity of the user corresponds to an identity of a meeting organizer;
   responsive to determining that the identity of the user corresponds to an identity of a meeting organizer, authenticating, by voice recognition, using a credential service on a networked computer system, the identity of the user to the identity of the meeting organizer;
   obtaining, using the credential service on the networked computer system, user credentials associated with the user responsive to authenticating the identity of the user to the identity of the meeting organizer;
   providing the user credentials to a computer located in the predetermined meeting area to automatically log the user in to the computer;
   starting one or more meeting resources used to present a presentation associated with the meeting organizer based on the authentication of the user, one of said resources comprising the computer located in the predetermined meeting area used to present the presentation;
   notifying any required meeting attendees determined not to be in attendance, said notifying based on a determination of whether each missing required meeting attendee is logged in to a social network and, when so, sending a message to the missing attendee via the social network, and, when not so, sending a message to the missing attendee via text message; and
   receiving non-touch user input from the meeting organizer to progress through the presentation.

2. The method of claim 1 wherein the proximity-based sensor comprises a camera; and
   wherein said facial recognition includes receiving video frames through the proximity-based sensor.

3. The method of claim 2 wherein said facial recognition further includes comparing the video frames to face prints stored in a facial identification database.

4. The method of claim 2 wherein said voice recognition includes:
   receiving the user's voice through a microphone; and
   recording the user's voice received through the microphone to generate audio frames.

5. The method of claim 4 wherein said voice recognition further includes comparing the audio frames to voice prints stored in a voice identification database.

6. The method of claim 1 wherein required attendees are notified via one or more social networks.

7. The method of claim 1 wherein required attendees are notified by text message.

8. The method of claim 1 wherein said non-touch user input comprises speech.

9. The method of claim 1 wherein said non-touch user input comprises detection and recognition of physical movement by the meeting organizer.

10. An apparatus, comprising:
    at least one processor configured to execute computer-executable instructions; and
    at least one memory storing the computer-executable instructions, which when executed by the processor, cause the apparatus to perform:
    detecting a physical presence of a user in a predetermined meeting area, said detection using a proximity-based sensor;
    determining an identity of the user based on the proximity-based sensor by facial recognition;
    determining that the identity of the user corresponds to an identity of a meeting organizer;
    responsive to determining that the identity of the user corresponds to an identity of a meeting organizer, authenticating, by voice recognition, using a credential service on a networked computer system, the identity of the user to the identity of the meeting organizer;
    obtaining, using the credential service on the networked computer system, user credentials associated with the user responsive to authenticating the identity of the user as the meeting organizer;
    providing the user credentials to a computer located in the predetermined meeting area to automatically log the user in to the computer;
    starting one or more meeting resources used to present a presentation associated with the meeting organizer based on the authentication of the user, one of said resources comprising the computer located in the predetermined meeting area used to present the presentation;
    notifying any required meeting attendees determined not to be in attendance, said notifying based on a determination of whether each missing required meeting attendee is logged in to a social network and, when so, sending a message to the missing attendee via the social network, and, when not so, sending a message to the missing attendee via text message; and
    receiving non-touch user input from the meeting organizer to progress through the presentation.

11. The apparatus of claim 10 wherein the proximity-based sensor comprises a camera; and
    wherein said facial recognition includes receiving video frames through the proximity-based sensor.

12. The apparatus of claim 11 wherein said facial recognition further includes comparing the video frames to face prints stored in a facial identification database.

13. The apparatus of claim 11 wherein said voice recognition includes:
receiving the user's voice through a microphone; and
recording the user's voice received through the microphone to generate audio frames.

14. The apparatus of claim 13 wherein said voice recognition further includes comparing the audio frames to voice prints stored in a voice identification database.

15. The apparatus of claim 10 wherein required attendees are notified via one or more social networks.

16. The apparatus of claim 10, wherein required attendees are notified by email.

17. The apparatus of claim 10 wherein required attendees are notified by text message.

18. The apparatus of claim 10 wherein said non-touch user input comprises speech.

19. The apparatus of claim 10 wherein said non-touch user input comprises detection and recognition of physical movement by the meeting organizer.

20. One or more tangible computer readable media storing computer executable instructions that, when executed, configure a system to perform:
detecting a physical presence of a user in a predetermined meeting area, said detection using a proximity-based sensor;
determining an identity of the user based on the proximity-based sensor by facial recognition;
determining that the identity of the user corresponds to an identity of a meeting organizer;
responsive to determining that the identity of the user corresponds to an identity of a meeting organizer, authenticating, by voice recognition, using a credential service on a networked computer system, an identity of the user as a meeting organizer, said authenticating based on voice recognition;
obtaining, using the credential service on the networked computer system, user credentials associated with the user responsive to authenticating the identity of the user as the meeting organizer;
providing the user credentials to a computer located in the predetermined meeting area to automatically log the user in to the computer;
starting one or more meeting resources used to present a presentation associated with the meeting organizer based on the authentication of the user, one of said resources comprising the computer located in the predetermined meeting area used to present the presentation;
notifying any required meeting attendees determined not to be in attendance, said notifying based on a determination of whether each missing required meeting attendee is logged in to a social network and, when so, sending a message to the missing attendee via the social network, and, when not so, sending a message to the missing attendee via text message; and
progressing the presentation based on audio or video input received from the meeting organizer.

21. The method of claim 1 further comprising:
determining a storage location at which one of the meeting resources is stored; and
downloading that meeting resource from the storage location to the computer in the predetermined area.

22. The method of claim 1, wherein authenticating the identity of the user to the identity of the meeting organizer comprises:
authenticating, using the credential service on the networked computer system, the identity of the user to the identity of the meeting organizer based on user-specific information received from the user in response to a request for the user-specific information.

23. The method of claim 5, wherein determining that the identity of the user corresponds to an identity of a meeting organizer includes querying an electronic calendar of the user and determining that the user is host of an online meeting, and further comprising:
determining, by a rules engine, responsive to determining that the identity of the user corresponds to the identity of the meeting organizer, that the user needs to be further authenticated as the meeting organizer; and
wherein authenticating the identity of the user to the identity of the meeting organizer by voice recognition is responsive to the rules engine determining that the user needs to be further authenticated as the meeting organizer.

24. A method comprising:
detecting a physical presence of a user in a predetermined meeting area, said detection using a proximity-based sensor;
determining an identity of the user based on the proximity-based sensor by facial recognition;
determining that the identity of the user corresponds to an identity of a meeting organizer;
responsive to determining that the identity of the user corresponds to an identity of a meeting organizer, authenticating, by voice recognition, using a credential service on a networked computer system, the identity of the user to the identity of the meeting organizer;
obtaining, using the credential service on the networked computer system, user credentials associated with the user responsive to authenticating the identity of the user to the identity of the meeting organizer;
providing the user credentials to a computer located in the predetermined meeting area to automatically log the user in to the computer;
starting one or more meeting resources used to present a presentation associated with the meeting organizer based on the authentication of the user, one of said resources comprising the computer located in the predetermined meeting area used to present the presentation;
notifying any required meeting attendees determined not to be in attendance;
receiving non-touch user input from the meeting organizer to progress through the presentation;
checking social network sites of each of the required attendees to determine whether each of the required attendees are online in one of the social networks; and
wherein notifying any required meeting attendees determined not to be in attendance includes
posting meeting reminder messages in the one or more social networks for those of the required attendees that are determined not to be in attendance that are online in one of the social networks, and
sending electronic mail reminder meeting reminder messages to those of the required attendees that are determined not to be in attendance that are not online in one of the social networks.

* * * * *